(12) United States Patent
Udani

(10) Patent No.: US 8,473,976 B2
(45) Date of Patent: Jun. 25, 2013

(54) CONSUMER MANAGED CREDIT BASED ADVERTISEMENTS

(75) Inventor: Sanjay K. Udani, Arlington, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 457 days.

(21) Appl. No.: 12/576,349

(22) Filed: Oct. 9, 2009

(65) Prior Publication Data

US 2011/0088057 A1 Apr. 14, 2011

(51) Int. Cl.
| | |
|---|---|
| *H04N 7/16* | (2006.01) |
| *H04H 60/33* | (2008.01) |
| *H04H 20/14* | (2008.01) |
| *H04H 60/29* | (2008.01) |
| *H04N 21/4784* | (2011.01) |
| *G06Q 30/02* | (2012.01) |
| *H04N 21/81* | (2011.01) |
| *H04N 21/442* | (2011.01) |

(52) U.S. Cl.
CPC ....... *H04N 21/4784* (2013.01); *G06Q 30/0207* (2013.01); *H04N 21/812* (2013.01); *H04N 21/44222* (2013.01)
USPC ......... 725/23; 725/9; 725/22; 725/29; 725/32

(58) Field of Classification Search
USPC ........................................... 725/32
See application file for complete search history.

(56) References Cited

U.S. PATENT DOCUMENTS

| | | | | |
|---|---|---|---|---|
| 6,057,872 | A * | 5/2000 | Candelore | 725/23 |
| 6,553,178 | B2 * | 4/2003 | Abecassis | 386/291 |
| 7,546,617 | B1 * | 6/2009 | Kienzle et al. | 725/23 |
| 2007/0067297 | A1 * | 3/2007 | Kublickis | 707/9 |
| 2007/0288951 | A1 * | 12/2007 | Ray et al. | 725/23 |
| 2008/0221986 | A1 * | 9/2008 | Soicher et al. | 705/14 |
| 2009/0249384 | A1 * | 10/2009 | Fang et al. | 725/23 |
| 2010/0290761 | A1 * | 11/2010 | Drake et al. | 386/350 |
| 2010/0333133 | A1 * | 12/2010 | Krakirian et al. | 725/32 |
| 2011/0231868 | A1 * | 9/2011 | Martens | 725/13 |

* cited by examiner

*Primary Examiner* — Bennett Ingvoldstad

(57) ABSTRACT

A device may include a storage device and a processor. The storage device may be configured to store video programs and advertisements. The processor may be configured to display a graphical user interface that provides a list of video programs and advertisements stored in the storage device, receive a user selection of a video program and advertisement in the list of video programs and advertisements, provide the advertisement to a content presentation device for user viewing, track whether the device plays the advertisement, determine a number of credits for playing the advertisement, and credit the user account based on the number of credits.

19 Claims, 9 Drawing Sheets

CONSUMER MANAGED CREDIT BASED ADVERTISEMENTS

BACKGROUND

By interacting with a set-top-box (STB), a user may select channels or programs on a television that is connected to the STB, adjust display characteristics of the television, and/or perform other interactive functions related to viewing multimedia content. A remote control may be used to transmit signals that represent key depressions/input selections to the STB via infrared light, for example.

DETAILED DESCRIPTION

The following detailed description refers to the accompanying drawings. The same reference numbers in different drawings may identify the same or similar elements. As used herein, the terms "playing content" may refer to decoding encoded content, and outputting the decoded content to a presentation device (e.g., television). The encoded content may be obtained from a local media (e.g., hard disk drive) or received from a remote device over a network.

Figure 1:
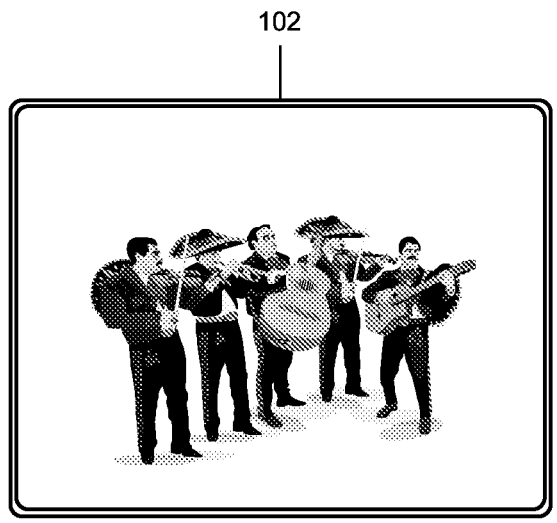
FIG. 1 illustrates concepts described herein.
Figure 1:
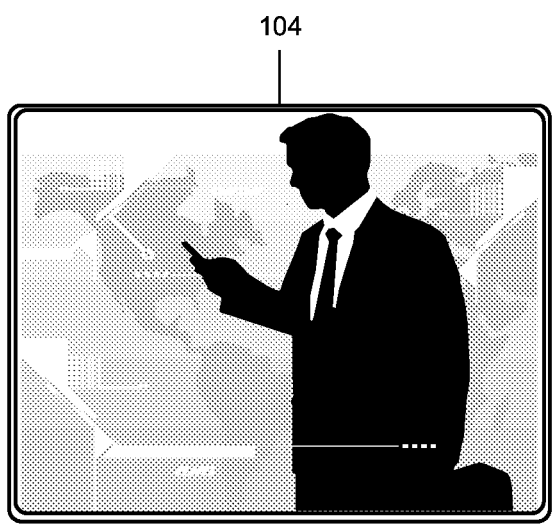

FIG. 1 illustrates the concepts described herein. Assume that a set-top box is playing a scheduled video program or a video-on-demand (VOD) video program 102 (e.g., a movie). At a particular time, the set top box presents a user with an advertisement 104 (e.g., a wireless network service commercial). When the user views advertisement 104, the user receives a credit. For example, the user may receive a credit that is applied to the user's monthly subscription fee or charged less for the specific program that is associated with the advertisement.

Figure 2:
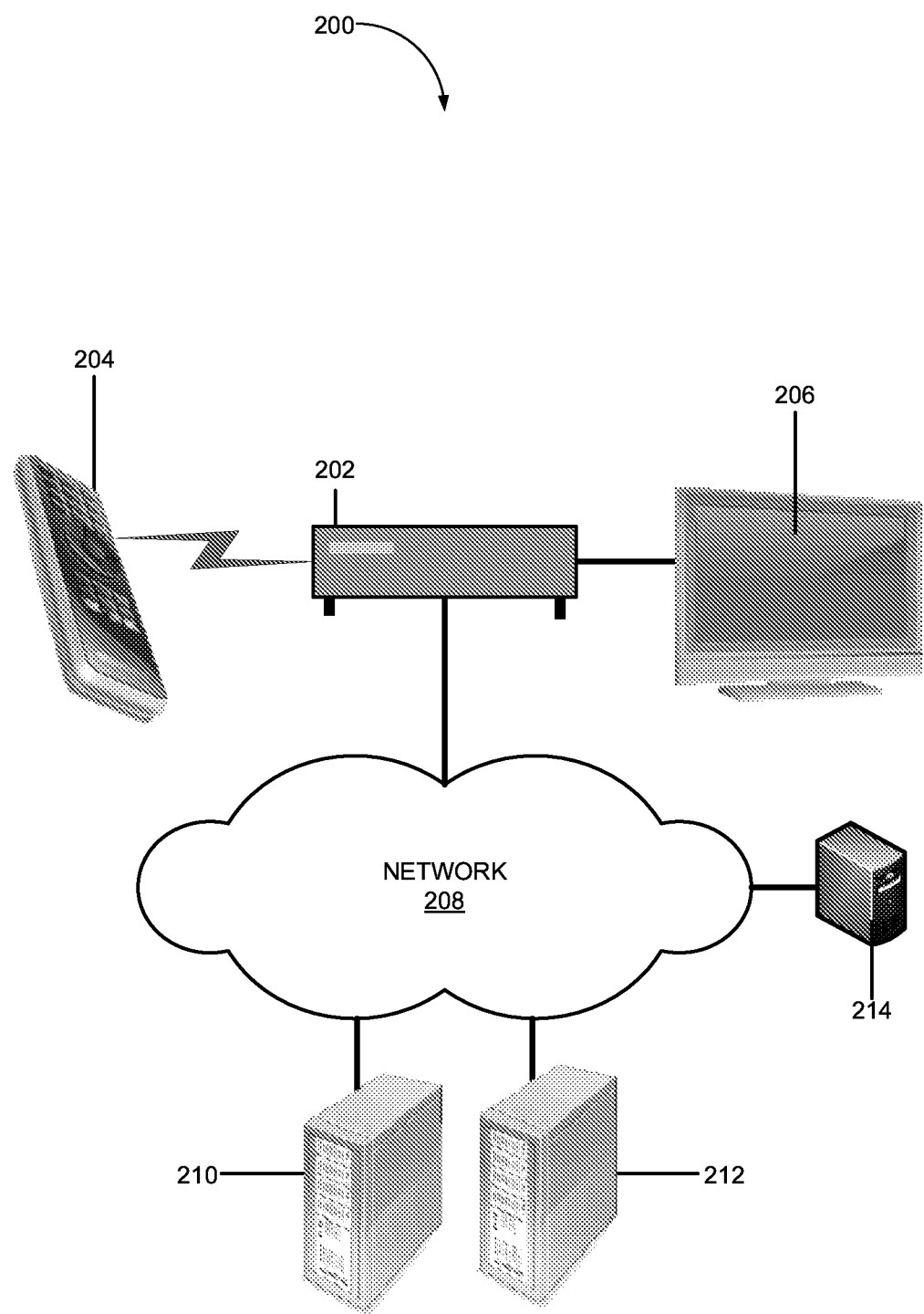
FIG. 2 is a block diagram of an exemplary network in which the concepts described herein may be implemented.

FIG. 2 is a block diagram of an exemplary network 200 in which the concepts described herein may be implemented. As shown, network 200 may include a content player device 202 (e.g., a set-top box), remote control 204, content presentation device 206 (e.g., a television, stereo system, etc.), network 208, content server device 210, content storage device 212, and billing system 214. In other implementations, network 200 may include additional, fewer, or different devices, or a different arrangement of the devices. For example, network 200 may include a content distribution system (e.g., a video/audio broadcast system), additional content presentation devices, etc. Moreover, one or more devices of network 200 may perform one or more functions of another device of network 200. For example, content player device 202 and content presentation device 206 may be implemented as a single device. In another example, data or information stored on content storage device 212 may be stored on multiple devices.

Content player device 202 may include a device for receiving encoded content over network 208, decoding the content, and/or outputting the decoded content to content presentation device 206. In some implementations, the content may be obtained from a content distribution system (e.g., a video/audio broadcast system) (not shown) via content-on-demand service and/or from a local storage component (e.g., a hard disk drive).

In addition to outputting decoded content to content presentation device 206, content player device 202 may perform actions in response to commands issued from remote control 204. When the command pertains to "real-time" video program (e.g., a command for content server device 210 to select and transmit a particular video program and/or advertisement to content player device 202, pausing the transmission, fast forwarding and/or rewinding to another part of the video program/advertisement, skipping the advertisement, changing a channel, etc.), content player device 202 may relay a substantive portion of the command from, for example, remote control 204, to content server device 210. When the command pertains to locally stored content (e.g., a video program/advertisement that is stored on content player device 202), content player device 202 may perform a particular action (e.g., play the content, pause playing the content, fast forward/rewind to another part of the content, skip an advertisement, delete the stored content, etc.) in accordance with the command, rather than forward the command to content server device 210.

Examples of content player device 202 may include a set-top box or a component (e.g., a cable card) that plugs-into a host device (e.g., a digital video recorder, a personal computer, a television, stereo system, etc.) and allows the host device to display multimedia content (e.g., contents on digital cable television channels). Although content player device 202 can be implemented as different types of devices (e.g., a set-top-box, computer, digital video disk (DVD) player, cable card, etc.), in the following, content player device 202 is described in terms of a set-top box.

Remote control 204 may include a device for issuing wireless commands to and for controlling electronic devices (e.g., a television, set-top box, stereo system, digital video disc (DVD) player, etc.). In one situation, remote control 204 may be used to switch channels or obtain content-on-demand (e.g., video-on-demand), including video programs/advertisements. In different implementations, in place of remote control 204, other types of devices (e.g., a wireless keyboard, mouse, handheld device (e.g., cell phone), etc.) may be used to control the electronic devices.

Content presentation device 206 may output media signals (e.g., audio or video) and/or signals that are received from content player device 202. Examples of content presentation device 206 may include a television, one or more speakers and a display, a portable digital assistant (PDA) or a cell phone capable of displaying a received video, etc. In the following paragraphs, content presentation device 206 is described in terms of a television.

Network 208 may include a fiber-optics network (e.g., passive optical networks (PONS)), an ad hoc network, a local area network (LAN), a wide area network (WAN), a wireless LAN, a metropolitan area network (MAN), a cellular network, a public switched telephone network (PSTN), an intranet, the Internet, a satellite-based network, any other network, or a combination of networks. Devices (e.g., content player device 202, content server device 210, etc.) that are shown in FIG. 2 may connect to network 208 via wireless or wired communication links. In addition, network 208 may allow any of devices 202 and 206-214 to communicate with any other device 202 and 206-214. In some embodiments, devices 202 and 206-214 may communicate with each other directly rather than through network 208.

Content server device 210 may include one or more devices for providing interactive content (e.g., a video program, audio program, advertisement, web page, etc.). Content server device 210 may obtain content from content storage device 212, send the content to content player device 202 and/or content presentation device 206, and/or provide viewing services to a user at content player device 202 over network 208. For example, content server device 210 may provide video-on-demand (VOD), television programs, advertisements, etc. stored on content storage device 212 to content player device 202. In addition, content server device 210 may provide credits to users for viewing advertisements, as described below in detail.

Content storage device 212 may include a database of content (e.g., a movie, a piece of music, an advertisement, text, web page, etc.). Based on a number of factors, content server device 210 may retrieve a particular piece of content from content storage device 212.

Billing system 214 may receive information pertaining to credits for viewing advertisements from content server device 212. Billing system 214 may be part of a network that provides content to content player device 202 or part of an entity that issued the advertisements. In either case, billing system 214 may apply the credits to appropriate user accounts (e.g., reducing monthly payment, sending electronic coupons to the user, paying the user, etc.).

Figure 3:
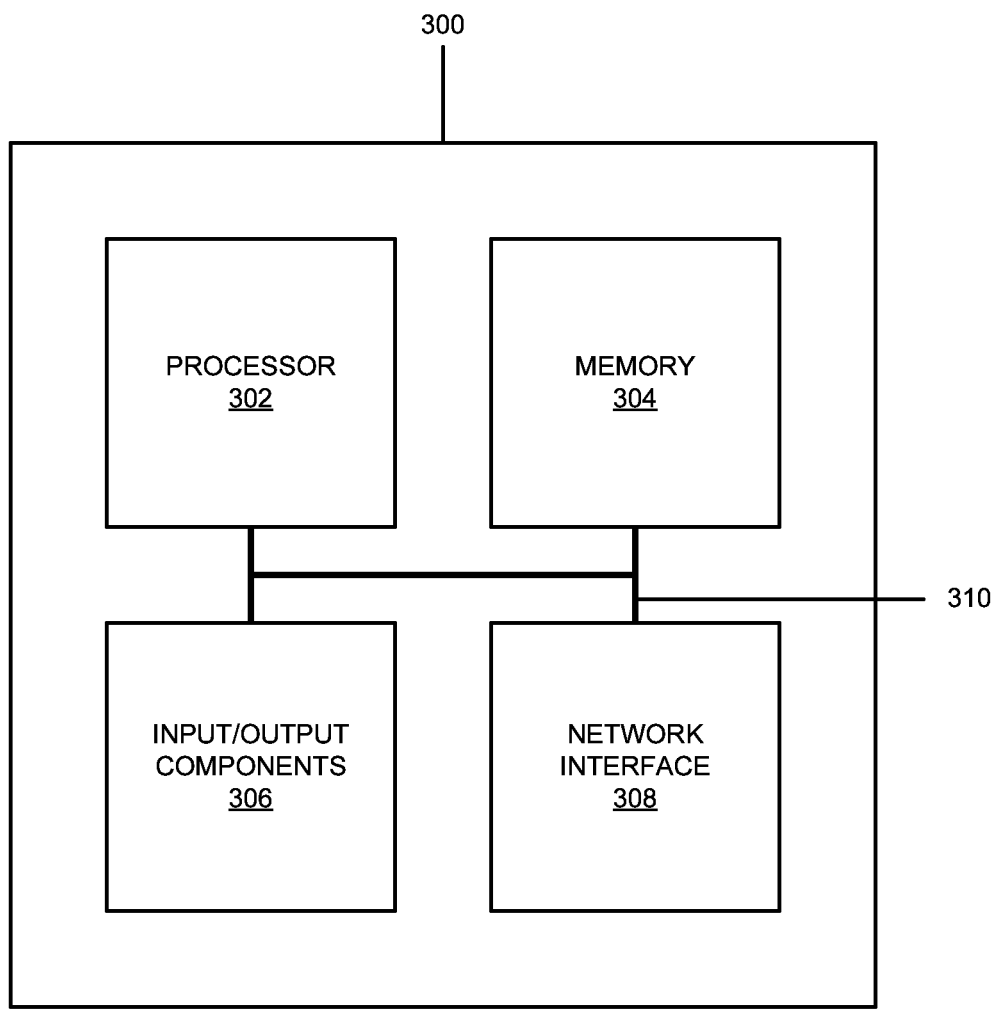
FIG. 3 is a block diagram of an exemplary device of FIG. 2.

FIG. 3 is a block diagram of an exemplary network device 300, which may correspond to content player device 202, content presentation device 206, content server device 210, content storage device 212, and/or a device in billing system 214. As shown, network device 300 may include a processor 302, a memory 304, input/output components 306, a network interface 308, and a communication path 310. In different implementations, network device 300 may include additional, fewer, or different components than the ones illustrated in FIG. 3. For example, network device 300 may include line interfaces, such as interfaces for receiving and forwarding data.

Processor 302 may include a processor, a microprocessor, an Application Specific Integrated Circuit (ASIC), a Field Programmable Gate Array (FPGA), and/or other processing logic capable of controlling network device 300. Memory 304 may include static memory, such as read only memory (ROM), and/or dynamic memory, such as random access memory (RAM), or onboard cache, for storing data and machine-readable instructions. Memory 304 may also include storage devices, such as a floppy disk, CD ROM, CD read/write (R/W) disc, and/or flash memory, as well as other types of storage devices.

Input/output components 306 may include a display screen, a keyboard, a mouse, a speaker, a microphone, a Digital Video Disk (DVD) writer, a DVD reader, Universal Serial Bus (USB) lines, and/or other types of components for converting physical events or phenomena to and/or from digital signals that pertain to network device 300.

Network interface 308 may include any transceiver-like mechanism that enables network device 300 to communicate with other devices and/or systems. For example, network interface 308 may include mechanisms for communicating via a network, such as the Internet, a terrestrial wireless network (e.g., a WLAN), a satellite-based network, etc. Additionally or alternatively, network interface 308 may include a modem, an Ethernet interface to a LAN, and/or an interface/connection for connecting network device 300 to other devices (e.g., a Bluetooth interface).

Communication path 310 may provide an interface through which components of network device 300 can communicate with one another.

Figure 4:
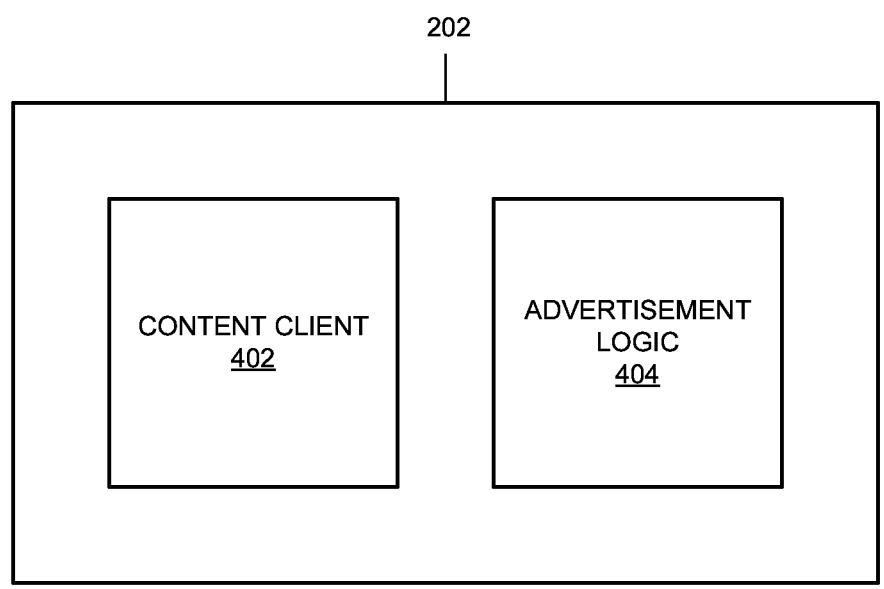
FIG. 4 is a functional block diagram of an exemplary content player device of FIG. 2.

FIG. 4 is a functional block diagram of content player device 202. As shown, content player device 202 may include a content client 402 and advertisement logic 404. Depending on the implementation, content player device 202 may include additional components, such as components illustrated in network device 300, an operating system (e.g., Linux, Windows, etc.), an application, etc. Furthermore, in some implementations, functionalities of content client 402 and/or advertisement logic 404 may be organized or integrated in a single component or more than two components.

Content client 402 may include hardware and/or software for outputting multimedia content/data that is received from content server device 210, for example, to content presentation device 206. Content client 402 may receive encoded audio/video data, and, based on the received encoded audio/video data, may generate audio/video signals (e.g., decoded audio/vido data) for content presentation device 206. Content client 402 may be implemented as a stand-alone application or as part of another component, such as a browser (not shown).

In addition, content client 402 may respond to a command issued from remote control 204. When the command pertains to real-time content from content server device 210 (e.g., a video-on-demand, scheduled video program, advertisement, etc.), content client 402 may relay a portion of the command to content server device 210. When the command pertains to locally stored content, content client 402 may perform one of particular functions that are associated with the stored content in accordance with the command, rather than forward the command to content server device 210.

Advertisement logic 404 may include hardware and/or software for providing functionalities that support content client 402 in playing advertisements that are stored locally at content player device 202. The functionalities may include: allowing a user to view an advertisement multiple times up to a certain number within a prescribed time; tracking whether a user has viewed a particular advertisement (e.g., whether the user has fast forwarded through an advertisement); sending a result of the tracking to content server device 210 or to a third party device (e.g., to receive credit for viewing the advertisement); disabling certain features of content client 402 (e.g., rewinding, pausing, fast forwarding, playing, etc. the advertisement) depending on the advertisement that is playing; displaying a query requesting the user to rate an advertisement after the user views the advertisement; sending a result of the rating to content server device 210; etc.

In some implementations, content client 402 and advertisement logic 404 may be implemented as Enhanced Television (ETV) application and ETV User Agent. The ETV application may include multimedia pages that specify functionalities described above for content client 402 and/or advertisement logic 404. The multimedia pages may conform to Enhanced Television Binary Interchange Format (EBIF), and may be stored locally at content player device 202 (e.g., to provide a GUI associated with playing content that is stored at content player device 202) or content server device 210 (e.g., to provide a GUI for controlling real-time video programs over network 208). The ETV User Agent may include a software component for receiving and/or processing the ETV application that is either stored locally or at content server device 210. In other implementations, content client 402 and advertisement logic 404 may not be implemented as ETV application ETV User Agent, but use another technology.

In providing the functionalities that are associated with video programs and/or advertising, content client 402 and advertisement logic 404 may interact with a user via a graphical user interface (GUI). When the user selects a particular menu item/link in the GUI, content client 402 and/or advertisement logic 404 may perform a particular function related to the menu item or the link. In a different implementation, a different type of user interface may be used to interact with the user (e.g., a haptic interface, a voice-activated user interface, etc.).

Figure 5A:
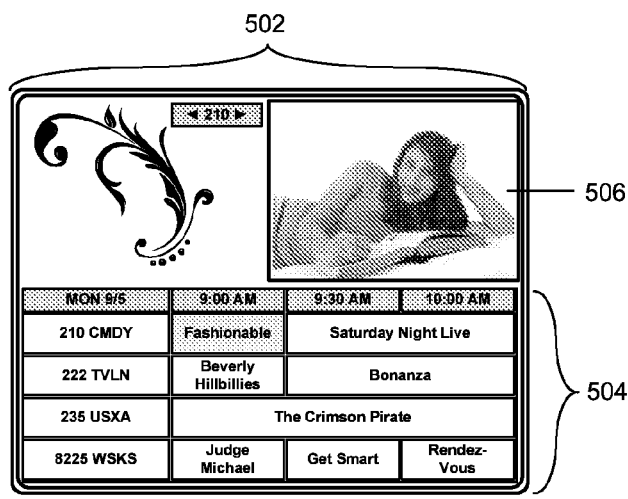
FIGS. 5A and 5B show exemplary graphical user interface (GUI) windows of a content client of FIG. 4.
Figure 5B:
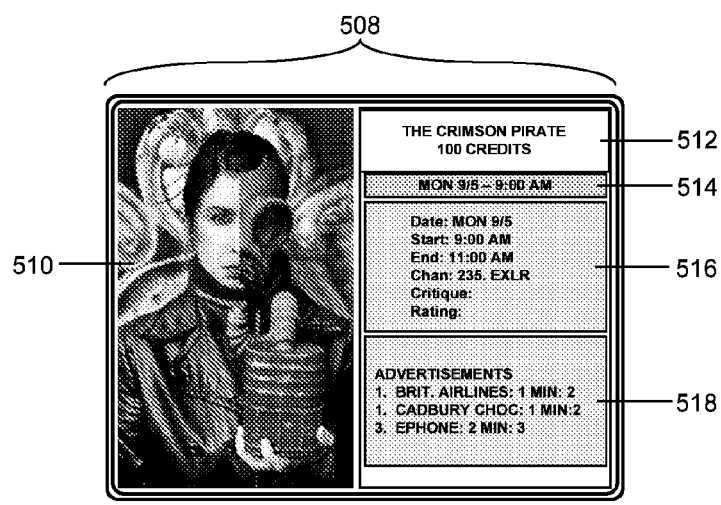

FIGS. 5A and 5B illustrate exemplary GUI windows of content client 402 and/or advertisement logic 404. FIG. 5A shows an exemplary schedule window 502 that displays a video program schedule. As shown, schedule window 502 may include a listing 504 and a preview window 506. Listings 504 may show a list of video programs scheduled to be sent from content server device 210 to content player device 202 at different times. Each item in listing 504 may be selected and/or activated via, for example, remote control 204. Activating the item may cause another GUI window to pop open and provide a different functionality (e.g., display information about the selected video program). Preview window 506 may show a video that is currently playing at a selected channel in listing 504. For example, in FIG. 5A, preview window 506 shows a video that is associated with the item "Fashionable" in listing 506.

FIG. 5B shows an exemplary program information window 508. Program information window 508 may provide an overview of a video program, which, for example, may be selected via schedule window 502. As shown, program information window 508 may include preview window 510, title pane 512, date pane 514, stat pane 516, and an advertisement pane 518. Preview window 510 may show a video or an image that is associated with the selected video program.

Title pane 512 may show the title of the selected video program (e.g., "The Crimson Pirate" in FIG. 5B). In some implementations, title pane 512 may also show the total number of advertisement credits that a user needs to accumulate to view the program for free (e.g., "100" in FIG. 5B). The user may collect advertisement credits when the user views particular advertisements.

Date pane 514 may display the current date and time. Stat pane 516 may display stats associated with the video program, such as the starting and ending time of the video program, channels at which the video program is transmitted, rating, cast, etc.

Advertisement pane 518 may display a list of advertisements that are associated with the selected video program. When the user watches the video program via content player device 202 and/or content presentation device 206, content client 402 may show, during the course of playing the program, each of the advertisements that are listed in advertisement pane 518.

In different implementations, schedule window 502 and program information window 504 may include additional, fewer, or different components than those illustrated in FIGS. 5A and 5B. Further, although FIGS. 5A and 5B illustrate only schedule window 502 and program information window 504, content client 402 and advertisement logic 404 may be capable of displaying other GUI windows (e.g., a video-on-demand window that lists movies or programs that a user may order and view, a navigation window for selecting and/or playing video programs that are stored at content player device 202, etc.).

Figure 6:
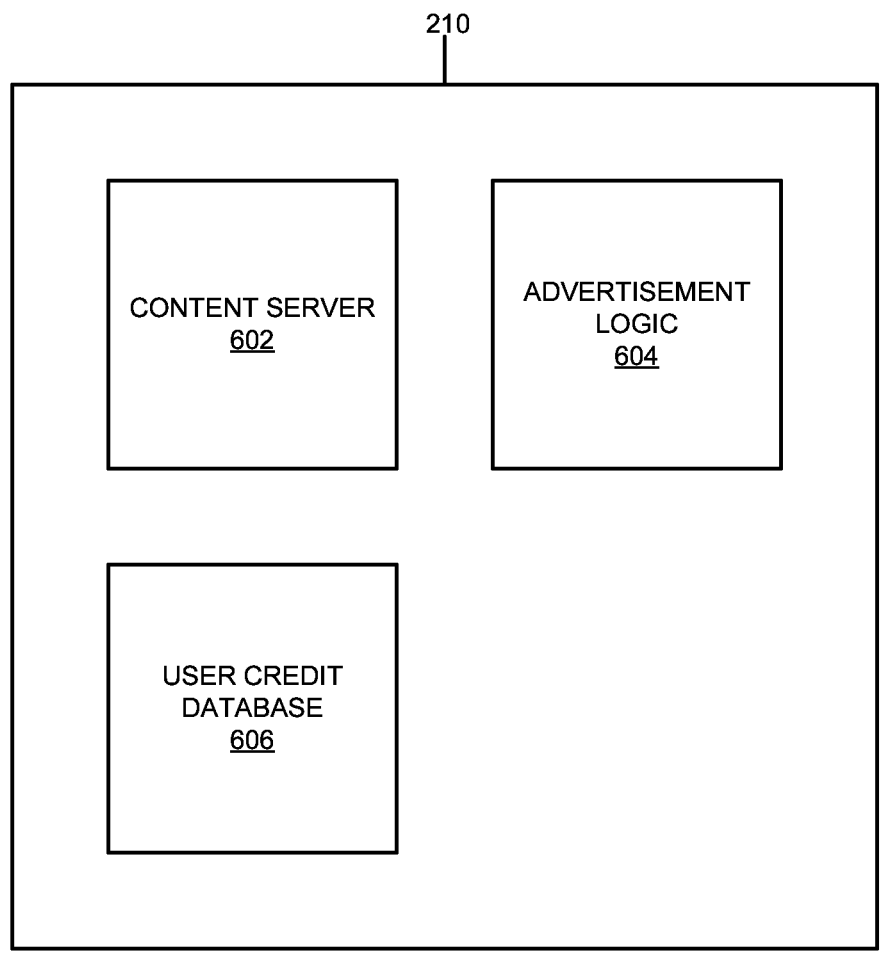
FIG. 6 is a functional block diagram of an exemplary content server device of FIG. 2.

FIG. 6 is a functional block diagram of content server device 210. As shown, content server device 210 may include a content server 602, advertisement logic 604, and a user credit database 606. Depending on the implementation, content server device 210 may include additional components, such as components illustrated in network device 300, an operating system (e.g., Linux, Windows, etc.), an application, etc. Furthermore, in some implementations, functionalities of content server 602 and/or advertisement logic 604 may be organized in a single component or more than two components.

Content server 602 may include hardware and/or software components for providing a remote application to or interacting with content player device 202. When a user interacts with the remote application, content player device 202 may send messages and/or commands over network 208 to content server 602. In response, content server 602 may provide services related to providing content, such as streaming a video or an advertisement, fast forwarding the video/advertisement, pause, rewind the video/advertisement, change a channel, etc. Content server 602 may obtain the content from a broadcasting service (not shown) and/or content storage device 212.

Advertisement logic 604 may include hardware and/or software components for providing services that are related to advertisements. The services may include functionalities that are similar to those provided by advertisement logic 404: allowing a user to view an advertisement multiple times up to a certain number within a specified time at content player device 202/content presentation device 206; tracking whether a user has viewed a particular advertisement (e.g., whether a user has fast forwarded through an advertisement, changed a channel, etc.) at content player device 202/content presentation device 206; determining the number of credits that are due to the user based on the tracking; disabling certain features of content client 402 on content player device 202 (e.g., rewinding, pausing, fast forwarding, playing, etc. an advertisement) depending on the advertisement that is playing; causing a remote content client 402/advertisement logic 404 on content player device 202 to provide a query asking the user to rate the advertisement; storing or debiting credits at a user account in user/credit database 606; sending information about the number of credits that are due to the user to a third party device, billing system 214, content player device 202, user email address, etc.; etc.

In some implementations, advertisement logic 604 may provide the credits to the user via electronic coupons for particular products or may reduce the user's payment for video program services in accordance with the credit the user has accumulated. In other implementations, advertisement logic 604 may allow a user to select and view video programs based on the accumulated credit. When a user orders content, the user credit may be debited accordingly.

In addition to the above, advertisement logic 604 may obtain, from content player device 202, information that is related to or describes a result of tracking advertisement viewing at content player device 202/content presentation device 206 (e.g., how many times a user has viewed an advertisement, which advertisement has been viewed, how much of an advertisement has been viewed without fast forwarding or skipping through portions of the advertisement, a result of a user survey/query after playing an advertisement, etc.).

Generally, advertisement logic 604 may use the tracking information to determine what type of advertisements may be associated (e.g., scheduled) with video programs. For example, if a user liked advertisements that are related to particular types of product (e.g., clothes), advertisement logic 604 may associate and/or send similar types of advertisements along with a video program to the user. In another example, advertisement logic 604 may schedule particular types of advertisements to be shown with scheduled video programs.

In some implementations, the result of the queries or surveys from different users may be aggregated and used to generate a profile of users' viewing habits and/or users' interests. These types of information may later be used for marketing videos, products, etc.

User credit database 606 may store records of user accounts. For each user account, a record may store how many credits each user has accumulated by watching advertisements. Depending on the implementation, a user may use the credits in user credit database 606 by, for example, converting some of the credits into e-coupons that are mailed to the user's email account; ordering and viewing a movie worth a particular number of credits; applying the credits to the amount that the user's monthly billing; etc.

Figure 7:
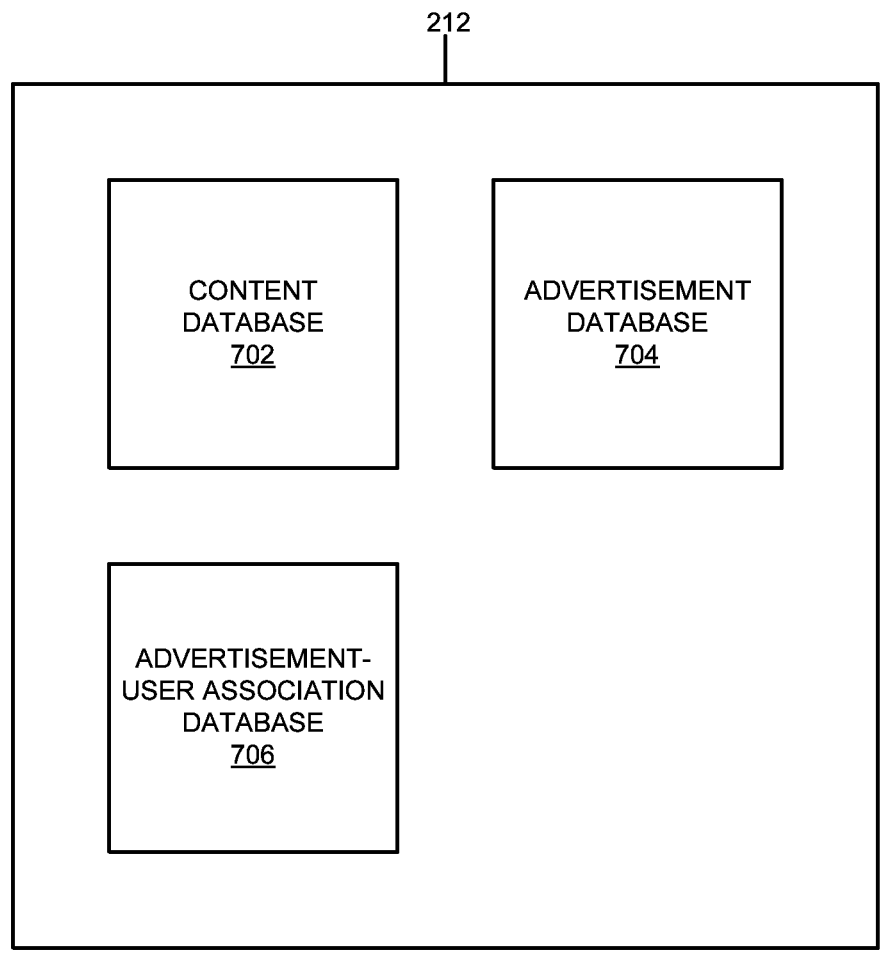
FIG. 7 is a functional block diagram of an exemplary content storage device of FIG. 2.

FIG. 7 is a functional block diagram of exemplary content storage device 212. As shown, content storage device 212 may include a content database 702, advertisement database 704, and advertisement-user association database 706. Depending on the implementation, content storage device 212 may include additional, fewer, or different components than those shown in FIG. 7. In some implementations, components of content storage device 212 may be distributed over multiple network devices.

Content database 702 may include video programs, such as a movie, video clip, episode of a television show, piece of commercial, song, audio clip, etc. Some of the video programs may include embedded advertisements. Advertisement database 704 may include advertisements. In addition, for each advertisement, advertisement database 704 may include additional data, such as how many credits a user may receive for watching the advertisement, how many times a user may watch the advertisement within a prescribed time, with what types of video programs the advertisement may be shown (e.g., non-violent video programs), and/or other types of metadata. If a particular advertisement is embedded within a video program, advertisement database 704 may also identify a location of the advertisement within the video program.

Advertisement-user association database 706 may include table entries that associate each advertisement with a user. For example, assume that a James Bond movie is in content database 602, and a user likes to view fashion commercials. In such an instance, advertisement-user association database 706 may include a record of an association between the user, the content (e.g., James Bond movie), and/or fashion commercials. In some implementations, advertisement-user association database 706 may include additional information, such as how many times the user has viewed particular advertisements within certain duration of time, a rating that the user gave to advertisements, etc.

Figure 8:
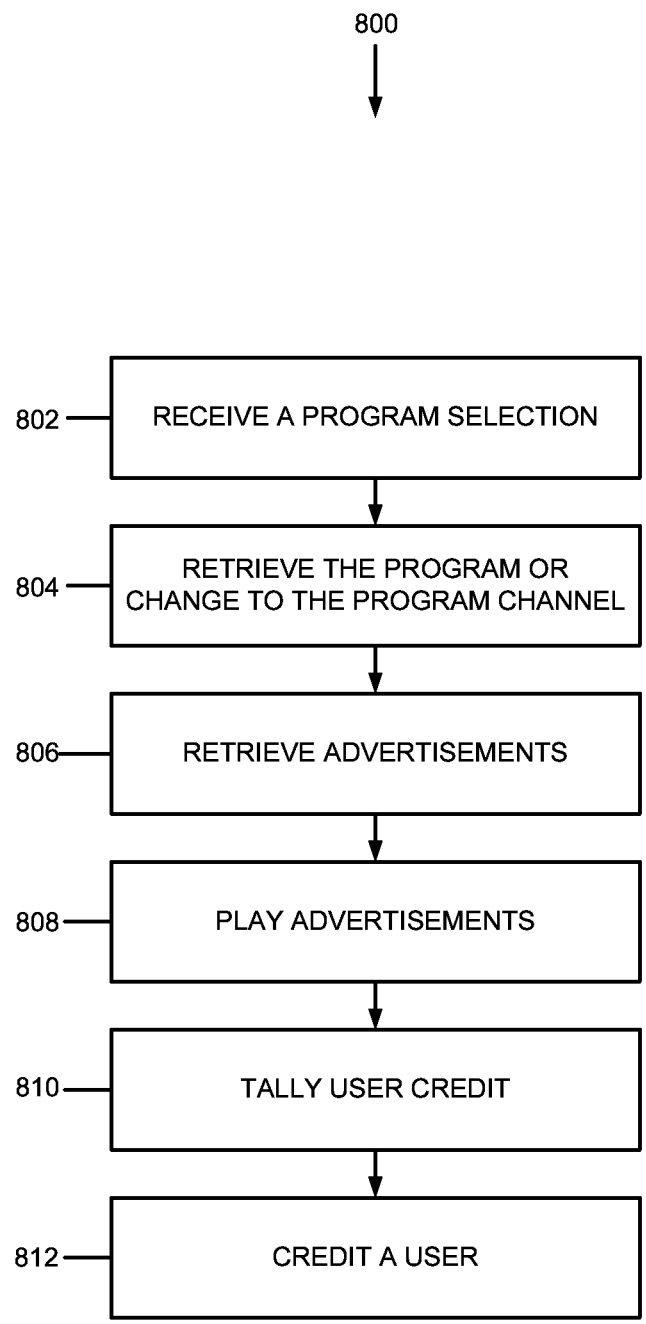
FIG. 8 is a flow diagram of an exemplary process that is associated with providing credits for viewing advertisements.

FIG. 8 is a flow diagram of an exemplary process 800 that is associated with providing credits for viewing advertisements. Process 800 may start when content player device 202 receives a program selection or program channel selection (block 802). The user may select a program via remote control 204. The selected content may be stored at content player device 202, or at content storage device 212.

Content player device 202 or content server device 210 may retrieve the selected video program or change a program channel (block 802). If the selected video program is locally stored, content client 402 may retrieve the video program from a local storage unit. If the selected program is stored at content storage device 212, content player device 202 may relay the user request to content server device 210, which then may retrieve the video program from content storage device 212.

In retrieving the program, content player device 202/content server device 210 may determine a list of advertisements that are associated with the user and/or the program. Subsequently, content player device 202/content server device 210 may retrieve the advertisements from the local storage or from content storage device 212 (block 806). Content server device 210 may stream the retrieved advertisements and/or program to content player device 202.

Content player device 202 may play the advertisements (block 808). Depending on the advertisement, content client 402 may prevent the user from using certain features/functionalities. For example, assume metadata associated with an advertisement specifies that the advertisement must be viewed at the beginning of a particular video program. In such an instance, content client 402 may not respond when a user issues a command (e.g., via remote control 204) to fast forward through the advertisement.

In another example, assume that the metadata of an advertisement specifies that viewing the advertisement multiple times within 24 hours may provide only up to three times the credit for viewing the program once. After the user views the advertisement three times within 20 minutes, content client 402 may stop accumulating the credits for the user, or alternatively, prevent the user from playing the advertisement (e.g., either skip the advertisement or disable a play button on a GUI interface of content client 402.

Content client 402 in content player device 202 or content server 602 in content server device 210 may tally user credits (block 810). When content client 402/content server 602 finishes playing an advertisement, content client 402/content server 602 may credit the user by an amount specified in metadata associated with the advertisement. If, for example, the user has fast forwarded through a portion the advertisement, the user may be given a pro-rated credit amount. In a different implementation, content client 402/content server 602 may prevent the user from fast forwarding through the advertisement or changing the channel once the advertisement begins to play and credit the user for the full amount associated with the advertisement.

Content client 402/content server 602 may credit the user based on the tallied credits (block 812). Content client 402/content server 602 may apply the credit for watching the advertisement to a user account, by accessing user credit database 609 and increasing the credit to the user by the amount the user earned by watching the advertisement.

Figure 9:
FIG. 9 illustrates an example that is associated with providing credits for viewing advertisements.
Figure 9:
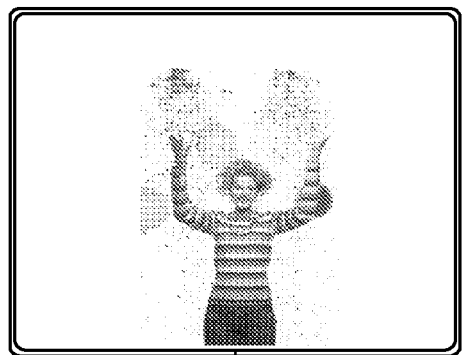
Figure 9:
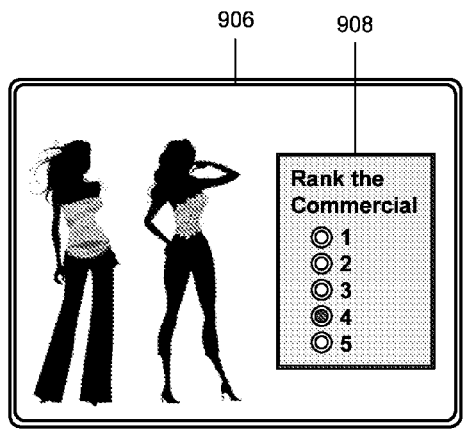
Figure 9:
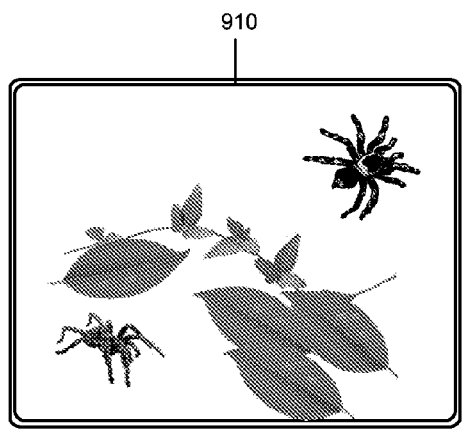

The above paragraphs describe system elements and processes that are related to devices and/or components for providing credits for viewing advertisements. The following example, with reference to FIG. 9 illustrates the processes for providing credits for viewing advertisements. The example is consistent with exemplary process 800 described above with reference to FIG. 8.

In FIG. 9, assume that a viewer, Greta, has just ordered a movie via a set-top box (e.g., content player device 202); content server device 210 has retrieved the appropriate content (e.g., the movie and advertisements that are associated with the viewer); and content server device 210 is ready to stream the content to the set-top box. In addition assume that the retrieved content includes an airline advertisement 902, a candy advertisement 904, a jeans advertisement 906, and a movie "The Tararantula" 910. Further, assume that each advertisement is 1 minute long.

When the set-top box receives airline advertisement 902, the set-top box outputs airline advertisement 902 to a television (e.g., content presentation device 206). Metadata that is associated with airline advertisement 902 indicates that a user may not skip viewing airline advertisement 902. Accordingly, content server 602 sends airline advertisement 902 to content player device 202. Although John tries to fast forward through airline advertisement 902, content server 602 temporarily does not respond to commands that are relayed from the set-top box to content server 602. In some implementations, a pop-up box, message box, or audio message may indicate to John that John cannot skip the advertisement, because John is receiving credit for viewing the advertisement. After playing airline advertisement 902, content server 602 assigns 10 user credits to John's account for watching airline advertisement 902.

Next, content server device 210 plays candy advertisement 904 featuring a clown. Having watched candy advertisement 904 for 5 seconds, Greta decides that she cannot tolerate the clown and decides not to watch the remainder of candy advertisement 904. Greta fast forwards to jeans advertisement 906. Content server 602 detects the fast forwarding, and adds zero credit (i.e., does not add any credit) to Greta's account for skipping candy advertisement 904.

Greta watches all of jeans advertisement 906. At the end of jeans advertisement 906, content server 602 adds 8 credits to Greta's account for watching jeans advertisement 906, and causes set-top box to display a survey box 908 on the television screen. By using remote control 204, Greta selects a rating of 4 for jeans advertisement 906, and content server 602 causes the set-top box to remove survey box 908 from the television screen. For answering the survey, content server 602 applies 2 more credits to Greta's account. Greta begins to watch movie "The Tarantula" 910.

Assume that Greta's account is configured such that content server 602/advertisement logic 604 applies the credits that Greta earned from watching advertisements to an amount Greta is charged by her content service provider, and that 10 credits correspond to $0.50. Content server 602/advertisement logic 604 sends information describing the 10 credits on Greta's account to billing system 214. In response, billing system 214 reduces Greta's monthly charge by $0.50. Content server 602/advertisement logic 604 resets the number of credits at Greta's account to zero.

In the above example, a system may provide credits to users for viewing advertisements. More specifically, content player device 202 and/or content server device 210 may present a user with an advertisement. When the user views the advertisement, content player device 202 and/or content server device 210 may assign credits to the user for viewing the advertisement.

The foregoing description of implementations provides illustration, but is not intended to be exhaustive or to limit the implementations to the precise form disclosed. Modifications and variations are possible in light of the above teachings or may be acquired from practice of the teachings.

In addition, while series of blocks have been described with regard to an exemplary process illustrated in FIG. 8, the order of the blocks may be modified in other implementations. In addition, non-dependent blocks may represent acts that can be performed in parallel to other blocks.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
    receiving, from a device associated with a subscription service account of a user, a request for a video program from a content storage device;
    selectively retrieving, based on the request for the video program:
        different advertisements associated with the video program identified in the request,
        first metadata indicating a corresponding credit amount related to a fast-forwarding of one or more portions of a presentation of a first advertisement,
        second metadata preventing a fast-forwarding of a presentation of a second advertisement, and
        third metadata preventing a presentation of a third advertisement in excess of a maximum number of presentations of the third advertisement within a particular amount of time;
    sending the different advertisements to the device;
    tracking, based on the first metadata, the fast-forwarding of the one or more portions of the presentation of the first advertisement;
    determining, based on the first metadata, a first number of credits based on results of the tracking relative to the corresponding credit amount;
    determining, based on the second metadata, a second number of credits corresponding to the presentation of the second advertisement;
    preventing, based on the third metadata, the presentation of the third advertisement in response to commands, relayed from the device, requesting the presentation of the third advertisement within the particular amount of time; and
    crediting, to the subscription service account, the first number of credits, the second number of credits, and a third number of credits corresponding to the maximum number of presentations of the third advertisement.

2. The method of claim 1, further comprising:
    determining, under the subscription service account, a charge for the video program corresponding to a particular number of credits; and
    debiting the particular number of credits from the subscription service account.

3. The method of claim 1, wherein tracking the fast-forwarding of the one or more portions of the presentation of the first advertisement includes:
    determining an amount of time corresponding to the one or more portions of the first advertisement, and wherein determining the first number of credits includes:

calculating the first number of credits based on the amount of time.

4. The method of claim 1, further comprising:
responding to user commands to fast forward through the presentation of the second advertisement with an indication that the fast-forwarding is not permitted.

5. The method of claim 1, further comprising:
presenting a query for rating the second advertisement; and
receiving user input in response to the query, wherein crediting the second number of credits includes providing a fourth number of credits to the user account based on the user input.

6. The method of claim 5, further comprising:
determining tracking information for a plurality of advertisements based on the user input; and
associating the user input with the plurality of advertisements.

7. The method of claim 1, further comprising:
transmitting an Enhanced Television (ETV) application to an Enhanced Television User Agent that is to process the ETV application at the device, the ETC application and the ETV User Agent that send the request for the video program from the device.

8. The method of claim 1, further comprising:
reducing an amount that otherwise would be billed for a monthly service in exchange for the credits in the subscription service account.

9. A device comprising:
a storage device configured to store video programs and advertisements selectively associated with the video programs;
a processor configured to:
display a graphical user interface that presents a list of the advertisements selectively associated with an identified one of the video programs, and available credits corresponding to each of the advertisements in the list of the advertisements;
receive a user selection of the identified video program and an advertisement in the list of the advertisements;
provide the selected advertisement to a content presentation device for presentation to a user via a presentation device using a presentation function;
track one or more presentations of the selected advertisement up to a maximum number of presentations within a particular amount of time;
disable the presentation function in response to receiving a user command requesting the presentation of the selected advertisement in excess of the maximum number;
determine, based on the tracked one or more presentations, a number of the available credits corresponding to each presentation of the one or more presentations of the selected advertisement; and
reduce, based on the number of the available credits, a subscription fee billed monthly to the user.

10. The device of claim 9, wherein the device includes at least one of:
a set-top box, cable card, digital video recorder, personal computer, television, or stereo system.

11. The device of claim 9, further comprising:
an Enhanced Television User Agent and an Enhanced Television application that are received from a remote device and that configure the processor to display the graphical user interface.

12. The device of claim 9, wherein when the processor credits the user, the processor is further configured to:
send information describing the number of the available credits to a remote device or a billing system.

13. The device of claim 9, wherein the video program includes:
a scheduled television program; a video clip; or a movie.

14. The device of claim 9, wherein the processor is further configured to:
present a survey for rating the presented advertisement,
receive a user rating, and
send a result of the user rating to a remote device that identifies the user's favorite advertisements based on received user ratings.

15. The device of claim 9, wherein the processor is further configured to:
not respond to user commands issued via a remote control to fast forward through the presentation of the selected advertisement.

16. A device comprising:
a processor configured to:
send an enhanced television application to a content player device;
receive a user selection of a video program and first and second advertising content via the enhanced television application, wherein the first advertising content includes first credit metadata related to fast-forwarding activity associated with a presentation of the first advertising content, and the second advertising content includes second credit metadata preventing a presentation of the second advertising content in excess of a maximum number of multiple presentations within a particular amount of time;
provide the video content and the first and second advertising content to the content player device;
track the fast-forwarding activity to determine first credit information based on the first credit metadata;
ignore a user command requesting the presentation of the second advertising content in excess of the maximum number of the multiple presentations within the particular amount of time;
determine a total number of credits based on the first credit information and second credit information corresponding to the multiple presentations of the second advertising content; and
apply a credit to a bill under a user account based on the total number of credits.

17. The device of claim 16, wherein the enhanced television application includes multimedia pages.

18. The device of claim 16, wherein the content player devices includes at least one of:
a set-top box, cable card, digital video recorder, personal computer, television, or stereo system.

19. The device of claim 16, wherein the processor is further configured to:
select the first and second advertising content from advertising content stored in one or more content storage devices based on user input.

* * * * *